June 7, 1949.　　　　H. C. ROTERS　　　　2,472,621
IMPULSE MOTOR
Filed June 29, 1945　　　　　　　　　　　　2 Sheets-Sheet 1
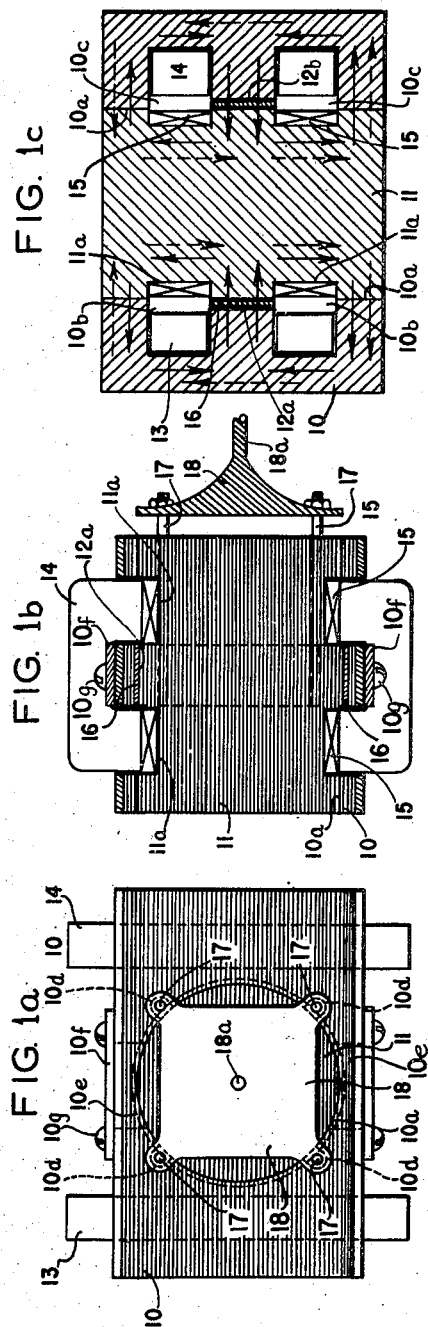
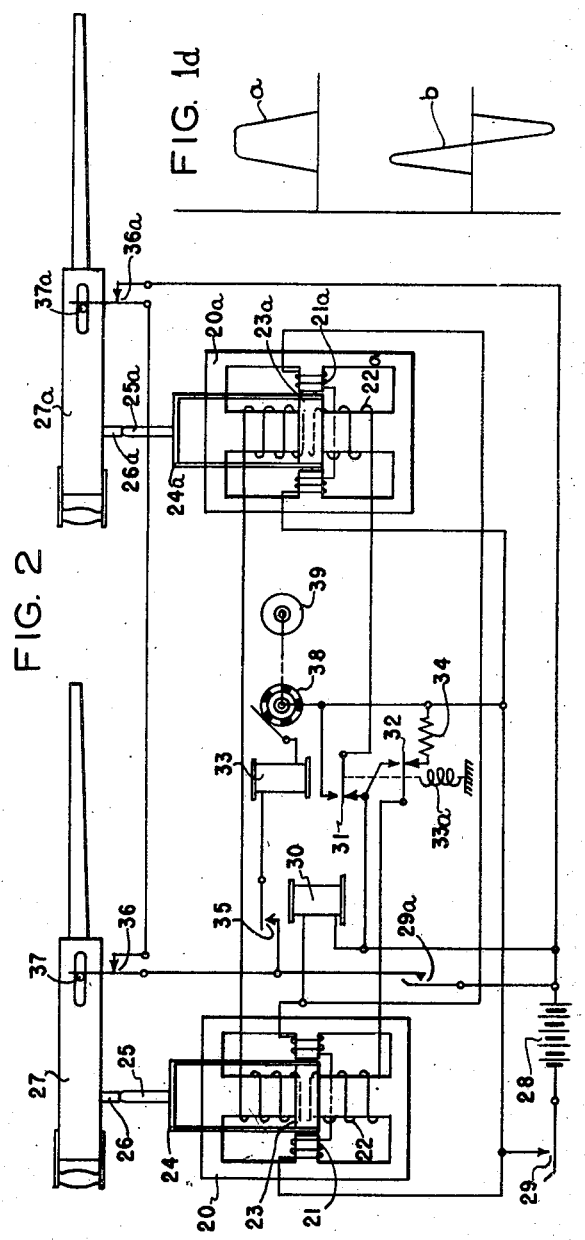
INVENTOR.
HERBERT C. ROTERS
BY Mueller, Dodd & Mason
ATTORNEYS

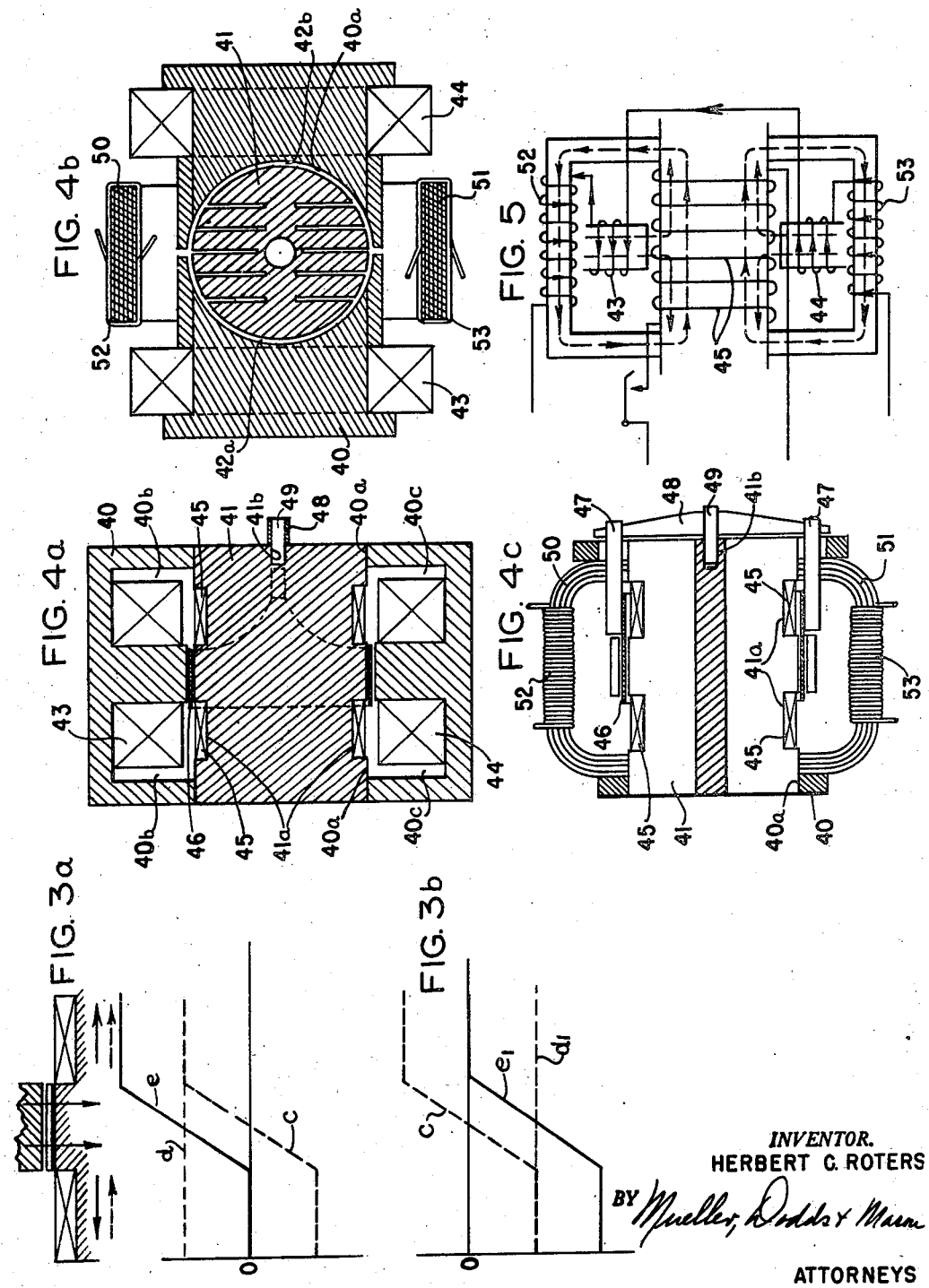

Patented June 7, 1949

2,472,621

UNITED STATES PATENT OFFICE 2,472,621

IMPULSE MOTOR

Herbert C. Roters, Roslyn, N. Y., assignor to Fairchild Camera and Instrument Corporation, a corporation of Delaware Application June 29, 1945, Serial No. 602,365

24 Claims. (Cl. 318—122)

This invention relates to impulse motors and, while it is of general application, it is particularly suitable for use in a system for synchronizing a machine gun with an aircraft propeller for firing therethrough or with one or more other machine guns.

In United States Letters Patent No. 2,225,599 granted December 17, 1940, on the application of J. P. Gaty et al. and assigned to the same assignee as the present application there is described and claimed an impulse motor particularly suitable for use for synchronizing a machine gun with an aircraft propeller. In general, the impulse motor of that patent comprises a so-called pot magnet having an annular air gap surrounding its central core and a movable coil armature disposed in such air gap and adapted to be excited with a unidirectional impulse current for actuating the armature to fire the gun. A biasing or retracting spring is provided for returning the armature to its normal position after a firing stroke and retaining it there in the absence of an excitation impulse. While the impulse motor of the aforesaid Gaty et al. patent is satisfactory for many applications, the present invention is directed to an improvement on such impulse motor and particularly to an impulse motor having the following improved characteristics which render it suitable for use in installations where the performance requirements are more exacting:

1. Reduced power consumption, and therefore reduced size, and reduced arcing at the interrupter contacts utilized to supply an impulse unidirectional current, by the use of the energy stored in the magnetic field during the forward or working stroke to return the armature to its initial position, thereby permitting the use of a biasing spring with a very light constant.

2. Reduced size and increased simplicity and ruggedness of the moving armature coil of the motor, thereby reducing the air gap and the required exciting magnetomotive force.

3. Elimination of flexible connecting leads to the moving armature coil.

4. Increased flexibility in the design of the armature coils by making them stationary so that they can be designed for any sized wire and for any voltage.

5. Substantial elimination of any coupling between the fields of the armature and the field magnet, thus avoiding dissipation of any of the armature power into the field circuit on the forward stroke and a return of such energy from the field circuit to the armature circuit on the return stroke, thus increasing the power output and speeding up the return of the armature to its normal position.

6. Increased sensitivity of the armature magnetic circuit by initially biasing it to a polarity opposite to that developed by the exciting impulse.

7. Reduction in overall size and weight and increase in compactness.

While an impulse motor having these improved characteristics is of general application, it is particularly suitable for embodiment in a system for synchronizing a plurality of aircraft turret machine guns and will be illustrated as applied to such an installation. Recently it has become customary to mount aircraft machine guns in groups in revolvable turrets and to aim the guns by the use of compensating gunsights which automatically take into account the ballistics of the projectile and the relative motion between the aircraft and its target. These gunsights have been developed to such a high state of perfection that the accuracy of the gunfire is no longer limited by the precision of the gunsight itself but rather by the stability of the gunmount. The effects of such instability or lack of rigidity in the gunmount are greatly magnified when the individual guns on the mount do not fire simultaneously as then the mount is subjected to severe movement introduced by the recoil of each individual gun. On the other hand, by firing all of such guns simultaneously and by mounting the gun symmetrically with respect to the points of support of the turret, the recoil forces of the guns are simultaneous and their moments on the turret are equal and opposite so that there is no distorting force or moment on the turret.

It is an object of the invention, therefore, to provide a new and improved impulse motor embodying one or more of the improved performance and constructional characteristics described above.

It is another object of the invention to provide a new and improved impulse motor which is compact in form and which, for a given power output is of minimum weight and requires minimum excitation power but provides maximum operating speed.

In accordance with the invention, an impulse motor comprises a magnetic circuit including an air gap, means for developing a constant magnetic field through the circuit and extending transversely of such air gap, means for impulse-magnetizing the portion of the magnetic circuit adjacent such gap substantially normally to such transverse field, and a reciprocable closed-circuit current-carrying means disposed in such air gap and including provisions for translating a mechanical impulse.

Further in accordance with the invention, an impulse motor comprises a magnetic circuit including an air gap, means for developing a constant magnetic field through the magnetic circuit and extending transversely of the air gap, means for magnetically biasing a portion of the magnetic circuit adjacent to such air gap substantially normally to the transverse field and for impulse-magnetizing the portion of the circuit with a polarity opposite to that of the magnetic bias. The motor also includes a reciprocable closed-circuit current-carrying member disposed in the air gap and including provisions for translating a mechanical impulse.

In a preferred embodiment of the invention, an impulse motor comprises a shell-type magnetic member having a cylindrical bore therein, a cylindrical core substantially filling the bore, a cross-sectional configuration of the member and core in a plane including the axis of the core comprising a closed outer yoke portion having a window therein, and a cruciform central core portion and including symmetrically disposed air gaps extending transversely of opposed legs of the core portion. The motor also includes means for developing opposed constant magnetic fields through the opposed legs, means for magnetically biasing the other opposed legs of such core portion in the same sense, means for impulse-magnetizing such other opposed legs with a polarity opposite to such magnetic bias, and reciprocable closed-circuit current-carrying means disposed in the air gaps and including provisions for translating a mechanical impulse.

For a better understanding of the invention, together with other and further objects thereof, reference is had to the following description taken in connection with the accompanying drawings while its scope will be pointed out in the appended claims.

Referring now to the drawings, Fig. 1a, 1b and 1c are elevation, cross-sectional and longitudinal sectional views, respectively, of an impulse-motor embodying the invention; Fig. 1d is a graph illustrating certain operating characteristics of the motor of Figs. 1a–1c, inc.; Fig. 2 is a schematic diagram of a system for synchronizing the firing of two machine guns and embodying the impulse motor of Figs. 1a–1c, inc.; Figs. 3a and 3b are graphs of certain operating characteristics of the impulse motor of Figs. 1 and 2 to aid in the explanation of its operation; Figs. 4a, 4b and 4c are cross-sectional views in the three principal planes of a modified form of impulse motor; while Fig. 5 is a schematic diagram of the magnetic circuit of the impulse motor of Figs. 4a–4c, inc.

Referring now to Figs. 1a, 1b and 1c of the drawings, there is represented an impulse motor suitable for use in a machine gun synchronizing system and comprising a magnetic circuit including an air gap and means for developing a constant magnetic field through the circuit and extending transversely of the air gap. For example, the magnetic circuit of the motor comprises a shell-type magnetic member 10 having a cylindrical bore 10a therein and two opposed pairs of winding slots 10b, 10b and 10c, 10c extending normal to the bore 10a and opening thereinto as shown in Fig. 1c. Disposed within the bore 10a is a cylindrical core 11 substantially filling the bore and having a pair of spaced annular winding slots 11a individually registering with the pairs of opposed slots 10b, 10b and 10c, 10c. The core 11 is preferably designed to fit tightly in the ends of the core 10 but to form an air gap between the portion of the core 10 separating the winding slots 10b and the winding slots 10c and the portion of the core 11 between the winding slots 11a.

Both the magnetic member 10 and the cylindrical core 11 are constructed of stacked electrical steel laminations which may be held together by a thermosetting plastic adhesive, such as a furfural resin commercially available as "Cycleweld cement," or by rivets judiciously spaced to minimize short-circuiting of the laminations. The laminations of the member 10 are rectangular in shape with the winding slots 10b, 10b and 10c, 10c punched therefrom. These laminations, after being arranged and secured into a stack are bored parallel to the laminations to form the bore 10a. A plug or section 10e is cut out from one center leg between the winding slots 10b, 10b and 10c, 10c to permit insertion of the field windings described hereinafter. This plug may be secured to a plate 10f secured to the member 10 by screws 10g. The core 11 is a similarly constructed stack which may be turned or gorund to the configuration described. Preferably the laminations of the member 10 and the core 11 lie in parallel planes.

The cross-sectional configuration of the magnetic member 10 and the core 11, when assembled, in a plane including the axis of the core is shown in Fig. 1c from which it is seen that it comprises a closed outer rectangular yoke portion having a rectangular window therein and a cruciform central core portion made up of the core 11 and the portions of the magnetic member 10 between the winding slots 10b, 10b and 10c, 10c. The space between the central projections of the magnetic member 10 and the core 11 form a pair of symmetrically disposed semi-cylindrical air gaps 12a, 12b extending transversely of two opposed legs of the cruciform core portion. In other words, the member 10 and the core 11 form a core portion between their respective pairs of winding slots having therein a continuous cylindrical or annular air gap made up of the two semi-circular air gaps 12a, 12b across the opposed legs of the cruciform core portion. The term "cylindrical" is used herein and in the appended claims in its generic geometric sense to refer to such a surface having a cross-section comprising a closed path of any desired configuration, including a circular path.

The impulse motor also includes a pair of field windings 13 and 14 individually disposed in the opposed pairs of winding slots 10b, 10b and 10c, 10c, respectively, to develop opposed constant magnetic fields through the opposed legs of the cruciform core portion and extending transversely of the air gaps 12a, 12b.

The impulse motor also includes means for developing an impulse magnetic field in the vicinity of the air gaps 12a, 12b, for example for impulse-magnetizing a portion of magnetic circuit adjacent such air gaps substantially normally to the transverse field developed by the windings 13 and 14, that is longitudinally of the air gaps. This means comprises a pair of armature windings 15 disposed in the annular slots 11a and adapted to be connected in series and excited with an impulse current to impulse-magnetize the other opposed legs of the cruciform core section in the same sense.

From Fig. 1c it is seen that the cross-section of the magnetic member 10 and the core 11, when assembled, are symmetrical about the axis of the core 11. Therefore, each half of this composite construction may be considered separately and, if desired, could be constructed separately to operate in exactly the same manner as the complete structure. Such a division would result in a magnetic circuit having a figure-8 cross-sectional configuration, a single field winding 13 or 14 developing a constant magnetic field through the central leg of the core section and the armature windings 15 impulse-magnetizing one outer leg thereof normal to the central leg. It will be apparent that the construction is adaptable to other cross-sectional configurations, although the complete construction described is preferred as being a simple one from a manufacturing viewpoint.

The impulse motor of the invention also includes a reciprocable closed-circuit current-carrying member 16 of highly conductive material disposed in the air gap 12a, 12b and including provisions for translating a mechanical impulse to a utilization device, for example to the sear pin of a machine gun. This actuating member 16 is preferably a cylindrical or annular ring of solid copper, aluminum or similar material disposed in the annular air gap 12a, 12b and having at least one and preferably a plurality of symmetrically spaced actuating rods 17 secured thereto and extending outside of the magnetic circuit through a plurality of grooves 10d spaced around the periphery of the bore 10a and parallel to its axis. The yoke or framework 18 interconnects the outer ends of the rods 17 and includes an operating extension or rod 18a for translating a mechanical impulse, as to a machine gun sear pin.

In considering the operation of the impulse motor of Figs. 1a, 1b and 1c, reference is made particularly to Fig. 1c in which the solid-line arrows represent the substantially constant but opposed magnetic fields developed by the field windings 13 and 14 adapted to be excited with constant direct current. The dotted-line arrows represent the general configuration of the impulse magnetization developed by the armature windings 15 when excited with an impulse of direct current. The impulse field developed by the armature windings 15, being closely coupled with the closed-circuit conductive ring 16, induces therein a double impulse voltage and current comprising two impulses of opposite polarity, the member 16 constituting effectively a short-circuited secondary of a transformer of which the armature windings 15 constitute the primary. This is represented in Fig. 1d in which the pulse $a$ represents the impulse unidirectional current flowing through the armature windings 15 and, therefore, the impulse magnetic field developed thereby. It is elementary that the induced voltage in the ring 16 is the first derivative of this impulse-magnetizing field, this derivative being represented by the double impulse $b$ of Fig. 1d. Since the impedance of the member 16 is substantially entirely resistive, the secondary current flowing therein is also substantially of the form of the double pulse wave $b$. The current represented by wave $b$ flowing in member 16 causes it to act as a motor winding, developing a mechanical impulse in one direction during the positive impulse of the wave $b$, which may be the working or firing stroke, and a mechanical impulse of the opposite polarity during the negative portion of the wave $b$, which may act as the restoring impulse for returning the member 16 and any connected elements to their normal or zero position.

Thus the energy built up in the magnetic field by the armature windings 15 during the first half of the current impulse of wave $a$ is returned to the actuating member 16 during the second half of the pulse wave $a$ and furnishes the power necessary to secure a rapid return of the member 16 and any connected elements to their zero or normal position. This arrangement also minimizes sparking at the contacts in the circuit devised to develop the unidirectional current impulse of curve $a$ and also permits the use of an extremely light biasing spring (not shown) normally to position the actuating member 16 in its zero position. Therefore, the motor need not overcome the force of a large biasing spring during the forward or power stroke, which permits the use of a much smaller impulse motor for a given power stroke or provides a very greatly increased power stroke for a given size of motor.

From Fig. 1c it is seen that there is absolutely no coupling between the field windings 13 and 14 and the armature windings 15. This follows from the fact that, in the portions of the magnetic circuit which are common to the respective fields of the windings 13, 14 and the windings 15, such fields are aiding in one-half of the circuit and opposing in the other half of the circuit, so that their net magnetic coupling is zero. This elimination of the coupling between the field windings 13 and 14 and the armature windings 15 eliminates the power transfer from the armature windings to the field windings during the power stroke, and the consequent dissipation of a part of the armature power input, and the reverse transfer of power from the field circuit to the armature circuit during the return stroke, which retards the restoration of the armature field to its normal steady-state value and thus decreases the maximum permissible speed of operation of the impulse motor.

Referring now to Fig. 2, there is represented schematically the embodiment of a plurality of impulse motors of the type described in a system for synchronizing the operation of a plurality of motor-operated devices, such as the firing of two machine guns, each of the motors being connected and adapted to operate one of the guns. This system also includes means for magnetically biasing the portion of the magnetic circuit adjacent the air gap to increase the power output of an impulse motor of a given size. In this system each of the two impulse motors is assumed to be of the type illustrated in Figs. 1a-1c, inc., described above. The two motors 20 and 20a are represented schematically and are provided with field windings 21 and 21a, armature windings 22 and 22a, current-carrying actuating members 23 and 23a, actuating yokes 24 and 24a and actuating pins 25 and 25a, respectively. The pins 25 and 25a are disposed to engage the sear pins 26 and 26a of two machine guns 27 and 27a, respectively, which are assumed to be mounted on a single gun turret. The field windings 21 and 21a are connected in parallel to be energized from a suitable source, such as a battery 28, through a manually operable control switch 29 and the winding of a time-delay relay 30. There is provided a common circuit for impulse-exciting the armature windings 22 and 22a simultaneously. To this end, the windings 22 and 22a are connected in series to the source 28 through the movable contacts 31 and 32 of a two-pole double-throw reversing switch 33, so that the armature windings may be excited with either polarity from the source 28. The relay 33 is biased to its "reversed" position by a spring 33a. A current-limiting resistor 34 is included in series with the armature windings 22 and 22a when connected to the source 28 with reverse polarity. The winding of the reversing switch 33 is energized from the source 28 through a control circuit for the common exciting circuit of the armature windings 22 and 22a. This control circuit includes a plurality of control means, each being connected for operation by one of the motor-operated devices or guns 27 and 27a. Specifically this control circuit includes the contacts 35 of the time-delay relay 30 and switches 36 and 36a adapted to be operated by the firing bolts 37 and 37a of the guns 27 and 27a, respectively. The arrangement of the switches 36 and 36a is such that they are closed when their respective guns are in firing positions and opened immediately after the firing of the guns. If desired, a synchronizing interrupter 38 driven by a motor 39 may be included in the circuit of the winding of the reversing relay 33 to determine the rate of firing of the guns 27 and 27a.

In considering the operation of the synchronizing system of Fig. 2, it will be assumed that the guns 27 and 27a are in firing position so that the switches 36 and 36a are closed by the firing bolts 37 and 37a, respectively, and that the motor 39 is not operating but that the interrupter 38 is in a position to complete a circuit therethrough to the reversing relay 33. Under such conditions, if the manual control switch 29 is operated, the field windings 21 and 21a are energized therethrough and the time-delay relay 30 is thereupon energized and, after a time-interval sufficient to permit the fields of windings 21 and 21a to build up to their normal values, it closes its contacts 35 to energize the reversing relay 33. Prior to operation of the relay 33, its contact elements 31 and 32 are held in their lower positions by the spring 33a, connecting the armature windings 22 and 22a in series across the source 28 with a given polarity which may arbitrarily be called the reverse polarity. Under these conditions, the flux distribution in the vicinity of the air gap of each of the motors 20 and 20a is represented by Fig. 3a in which curve c represents the flux distribution in the core near the air gap due to the field windings. This has a constant negative value to the left of the air gap, as viewed in Fig. 3a, and an equal and positive value to the right of the air gap, the flux varying uniformly between these two extremes along the air gap. Curve d represents the armature flux along the air gap, which is of constant value equal to that of the field windings and of uniform polarity throughout the extent of the core 11. The resultant flux along the air gap is represented by curve e which has a zero value to the left of the air gap where the field and armature fluxes are equal and opposite and a value twice that of either the field or armature flux to the right of the air gap and varies uniformly along the gap between these two limiting values.

If now the armature flux represented by curve d were interrupted, as by opening the circuit of the armature windings, the resultant flux would change from that represented by curve e to that represented by curve c and the change in flux along the air gap would induce therein a voltage which would develop a current effective to produce a mechanical impulse, as described above. The magnitude of the current induced in the actuating coil of course varies with the total shift of the resultant flux. The maximum shift is, in turn, limited by the condition of approximate saturation of the magnetic member 10 by the field windings and of the armature core 11 by the armature windings.

However, in the operation of the system of Fig. 2, upon operation of the time delay relay 30, the reversing relay 33 is energized to operate its contacts 31 and 32 to their upper positions. The result of this operation of the reversing relay 33 is to connect the armature windings 22 and 22a in series across the source 28 with normal polarity. After a small but finite time, the armature fluxes through the armature cores build up to equal values of opposite polarity. The fluxes then are as represented in Fig. 3b, in which curve c represents the field flux, which is unchanged, curve $d_1$ represents the armature flux of reversed polarity and curve $e_1$ represents the new resultant core flux. Thus it is seen that the total swing of the core flux from the initial value represented by curve e to that represented by curve $e_1$ is twice the value which would result from a simple interruption of the armature current. Thus the mechanical power output of each motor may be approximately doubled without otherwise modifying the design and capacity of the motor while still working the core structure within the same limits of magnetic saturation.

Thus, upon operation of the reversing relay 33, the motors 20 and 20a operate to develop power mechanical impulses at their operating pins 25 and 25a to fire the machine guns 27 and 27a, respectively. At the end of the firing or working stroke described, the firing bolts 37 and 37a of the guns 27 and 27a, respectively, immediately after firing open their respective switches 36 and 36a, thus dropping out the reversing relay 33, the contacts 31 and 32 of which are quickly returned to their initial positions. The reverse power stroke is developed by the current induced in the current-carrying members 23 and 23a both by the collapse of their respective armature fields and the building up of the reverse polarity armature fields.

The rate of collapse of the armature fields is determined by the reluctance of the magnetic circuit of the armature windings and the effective resistance of the armature circuit as modified by the closed-circuit current-carrying members 23 and 23a. This rate of collapse of the armature-circuit flux can be controlled by selecting an appropriate value for the current-limiting resistor 34 to prevent excessive current rise in the armature windings while permitting the armature field to collapse sufficiently quickly to provide a powerful return stroke and a fast motor operation. Upon return of the reversing switch 33 to its normal position, as described, and the collapse of the armature fields, the resultant flux through the core structure again changes from that represented by curve $e_1$ of Fig. 3b to curve e of Fig. 3a and the system as a whole is in its initial operating condition.

After the firing of the guns 27 and 27a, the circuit of the reversing relay 33 cannot be subsequently completed for a second firing operation until both of the firing bolts 37 and 37a have dropped back into their firing positions, thereby closing both of the switches 36 and 36a; thus the excitation of the armature windings 22 and 22a is delayed until both of the guns 27 and 27a assume their pre-operating condition.

It will be noted that, for an instant during the operation of the reversing switch in either direction, the armature circuit is momentarily broken; however, the armature flux in this momentary interval is prevented from either increasing or decreasing substantially due to the short-circuiting effect of the current-carrying members 23 and 23a, which permit the flow of a secondary current sufficient to maintain the armature flux. The rate of increase or decrease of armature flux during this momentary interval is determined by the resistance of the current-carrying members 23 and 23a and the permeance of the magnetic circuit for the armature flux. By making this resistance low and the magnetic permeance high, the armature flux will change only insubstantially during this brief interval. As a corollary, only a moderate counter-electromotive force, which is proportional to the rate of change of armature flux, will appear at the contacts of the reversing relay 33, so that there is no substantial arcing at these contacts.

Thus it is seen that the system of Fig. 2 comprises means for magnetically biasing the portion of the magnetic circuit adjacent the air gap of the motor substantially normal to the transverse field and for impulse-magnetizing such portion of said circuit with a polarity opposite to that of the magnetic bias. The means for biasing the magnetic circuit comprises the switching arrangement for normally connecting the armature windings 22 and 22a to the supply source 28 with a given polarity for exciting the armature windings 22 and 22a magnetically to bias such portion of the magnetic circuit and the means for impulse-magnetizing such portion of the magnetic circuit comprises the circuit arrangement for connecting the armature windings 22 and 22a to the supply source 28 with reversed polarity to excite such windings with a current impulse. It will also be seen that the switches 36 and 36a comprise means responsive to operation of the actuating or translating members 25 and 25a for subsequently restoring the connection of the armature windings 22 and 22a to the supply source 28 with the initial given polarity; that is to connect the armature windings to the source 28 with reverse polarity for only a given interval.

As in the operation of the impulse motor of Figs. 1a–1c, inc., the change in armature current and armature flux upon the operation of the reversing relay, represented by the change from Fig. 3a to Fig. 3b, results in secondary currents in the current-carrying members 23 and 23a which react with their respective constant fields to produce mechanical impulses on their respective operating rods 25 and 25a. Upon the firing of the guns 27 and 27a and the dropping out of the reversing relay as described, the reversal of current in the members 23 and 23a is effected by the voltages induced in these members both by the collapse of the initial armature flux and by the building up of the armature flux to opposite polarity, as described. This reversed current in the members 23 and 23a is effective to develop a substantial restoring mechanical impulse opposite to the initial mechanical impulse, thus to return the members 23 and 23a and their associated elements quickly to their normal positions. This reversal of armature current further accelerates the return of the armature flux to its initial or positive value after a firing operation and thus permits a faster operation of the impulse motor. In practice, the normal time between shots of a machine gun is of the order of 85 milliseconds or less. It has been found that an impulse motor may be readily designed in accordance with the features described above to operate within a cycle of this order.

In case it is desired to control the firing of the guns 27 and 27a at some periodicity greater than that determined by their natural firing cycle, as described above, the interrupter 38 may be included in the circuit of the reversing relay 33 and driven by a motor 39. With this arrangement, the firing cycle will be initiated as described above but after the firing of the guns the completion of the circuit of the reversing relay 33 is delayed during the time that the circuit is opened at the interrupter 38 so that the firing cannot occur more frequently than at intervals determined by the successive closings of the circuit at the interrupter 38.

Further, if desired, there may be provided a manually operable normally open control switch 29a connected to short-circuit the gun-operated switches 36 and 36a. With such an arrangement, closing of the switch 29a will produce a current step through the armature windings 22 and 22a, causing the core flux to shift from the value represented by curve $e$ of Fig. 3a to the value represented by the curve $e_1$ of Fig. 3b and producing a forward or working stroke of the motor. At a desired interval thereafter, the switch 29a may be opened and a reverse current step applied to the armature windings 22 and 22a to produce a return working stroke. In this way the working and return strokes may be irregularly spaced as desired to provide what might be termed a double-acting impulse motor. However, in the operation of the motor in this fashion, the armature windings and the magnetic circuit must be relatively so proportioned that the core field will limit the rise in armature current and maintain a rate of change of flux in one sense or the other during the longest interval between successive steps. Otherwise, the current in the armature windings tends to rise to excessive values as the armature flux approaches a constant value, that is when its rate of change approaches zero, while the motor current in the members 23 and 23a, and thus the motor force, will fall to zero. The term "impulse" is used herein and in the appended claims in its generic sense to include either a complete pulse comprising forward and reverse impulses or a single step or impulse.

In Figs. 4a, 4b and 4c are represented a modified form of the impulse motor of the invention in which the magnetic biasing of the armature core is effected by an auxiliary magnetizing circuit rather than by a reversal of the armature current.

The impulse motor of Figs. 4a–4c, inc., is in many respects similar to that of Figs. 1a–1c, inc. In general, it comprises a magnetic member 40 of generally rectangular cross-sections, which may be of cast steel, and provided with a cylindrical bore 40a and two pairs of opposed winding slots 40b, 40b and 40c, 40c in which are disposed field windings 43 and 44, respectively. Mounted in the bore 40a is a cylindrical core 41 which may be of slotted cast steel. The core 41 is provided with a pair of annular winding slots 41a and is proportioned completely to fill and closely fit within the outer ends of the bore 40a but to provide a pair of semi-cylindrical air gaps 42a and 42b between the extension of the field member 40 between the winding slots and the portion of the core 41 between its winding slots. Within the annular winding slots 41a are disposed a pair of armature windings 45. Mounted in this air gap is a current-carrying member of conductive material, such as an annular copper or aluminum ring 46. The current-carrying member 46 is connected to an actuating yoke 48 through a plurality of push-rods 47, the yoke 48 being centered by a pin 49 having a sliding fit in a recess 41b in the end of the core 41.

The impulse motor of Figs. 4a-4c, inc., so far described is functionally equivalent to that of Figs. 1a-1c, inc.; however, in the former structure there are provided a pair of auxiliary magnetic biasing circuits substantially independent of the magnetic member 40 and extending between opposite ends of the core member 41. These auxiliary circuits may comprise two opposed groups of nested laminations 50 and 51 mounted on either side of the magnetic member 40 and extending to the opposite ends of the core member 41 approximately normally to the engagement of the core 41 by the magnetic member 40. The auxiliary magnetic circuits 50 and 51 are provided with windings 52 and 53, respectively, for magnetically biasing the core 41 with a polarity opposite to the magnetization thereof by its armature windings 45.

The general principles of operation of the motor of Figs. 4a-4c, inc. are similar to those of the motor described above as included in the system of Fig. 2, with the exception that, instead of reversing the armature flux as represented by curves $d$ and $d_1$ of Figs. 3a and 3b, respectively, by reversing the armature current, there is developed by the windings 52 a magnetic biasing flux which is comparable in value to the reversed armature flux, curve $d$, of the armature windings of the system of Fig. 2. In this latter arrangement, however, the impulse current supplied to the armature windings 45 is of such a value as to produce a flux approximately twice that produced by the armature windings of the modification of Figs. 1a-1c, inc., so that the effect is to reverse the initial bias flux, which may be represented by curve $d$ of Figs. 3a, to an equal flux of opposite polarity, represented by curve $d_1$ of Fig. 3b.

As indicated schematically in Fig. 5, the auxiliary magnetic circuit windings 52 and 53 may be connected in series with the main field windings 43 and 44 by a proper proportioning of the relative numbers of turns in these two groups of windings. The flux distribution is indicated schematically in Fig. 5 which, it is seen, is substantially identical to the flux distribution obtained in the motor of Figs. 1a-1c, inc., as shown in Fig. 1c. Alternatively, the motor of Figs. 4a-4b, inc., may be embodied in the system of Fig. 2 by exciting the main armature windings 45 through one of the sets of contacts of the reversing switch 33 and exciting the auxiliary biasing windings 52 and 53 through the other contacts of the reversing switch, thus producing a reversal of the armature flux by a switching of windings rather than by the reversal of current through a single winding. In this latter arrangement, however, the windings 45 and 52, 53 should be proportioned to develop armature fluxes represented by curves $d_1$ and $d$, respectively.

Thus it is seen that the impulse motor of the invention embodies the several desirable characteristics mentioned above. Briefly, the energy stored in the magnetic field during the forward or working stroke is returned to the actuating coil for producing a return or restoring stroke, thus eliminating the requirement of a heavy biasing spring and reducing the amount of work required on the forward stroke for a given output blow. At the same time, this reverse current in the actuating coil also aids in returning the armature flux to its normal steady-state value, increasing the speed of operation of the motor. The short-circuited actuating coil also substantially eliminates sparking at the contacts utilized to interrupt or reverse the armature current. Further in a preferred form of the invention, the armature magnetic circuit is biased and the armature flux is reversed in polarity so as to get substantially twice the change in armature flux for a given design otherwise obtainable and thus twice the power output of the motor. These characteristics are due to the action of the inductive coupling between the armature windings and the operating coil which effectively differentiates the pulse of armature current to obtain a positive working impulse and a negative return impulse.

At the same time, the construction of the motor is simplified in that the actuating coil may be a solid ring of copper or aluminum which is cheap, simple and rugged and provides an increased space factor in that no insulation is required. This increased space factor permits a reduction in the air gap and in the required exciting magnetomotive force. Further, this solid conductive actuating coil eliminates the requirement of flexible leads required by the conventional moving-coil impulse motor. The use of this solid actuating coil also permits the armature windings to be stationary so that they may be wound of any convenient size wire and for any voltage at which it is otherwise efficient to operate the system. Furthermore, the elimination of the coupling between the armature magnetic circuit and the field magnetic circuit in the preferred embodiment of the invention eliminates the dissipation of the armature power in the field circuit on the forward stroke of the motor and the reverse return of power from the field circuit to the armature circuit on the return stroke, which would otherwise slow down the return stroke and place a limit on the speed of operation of the motor. These several features combine to provide an impulse motor of maximum over-all compactness, minimum weight and power consumption and extreme ruggedness.

While there have been described what are at present considered to be the preferred embodiments of the invention, it will be apparent to those skilled in the art that various changes and modifications may be made therein without departing from the spirit or scope of the invention.

What is claimed as new is:

1. An impulse motor comprising, a magnetic circuit including an air gap, stationary means for developing a constant magnetic field through said circuit and extending transversely of said air gap, stationary means for developing an impulse magnetic field in the vicinty of said gap, and reciprocable means responsive jointly to said two fields and including provisions for translating a mechanical impulse.

2. An impulse motor comprising, a magnetic circuit including an air gap, a stationary field winding for developing a constant magnetic field through said circuit and extending transversely of said air gap, a stationary armature winding for developing an impulse magnetic field in the vicinity of said gap, and reciprocable means responsive jointly to said two fields and including provisions for translating a mechanical impulse.

3. An impulse motor comprising, a magnetic circuit including an air gap, a stationary field winding for developing a constant magnetic field through said circuit and extending transversely of said air gap, a stationary armature winding for developing an impulse magnetic field longitudinally of said gap, whereby said field and armature windings are substantially uncoupled, and reciprocable means responsive jointly to said two fields and including provisions for translating a mechanical impulse.

4. An impulse motor comprising, a magnetic circuit including an air gap, means for developing a constant magnetic field through said circuit and extending transversely of said air gap, means for impulse-magnetizing a portion of said magnetic circuit adjacent said gap substantially normally to said transverse field, and reciprocable closed-circuit current-carrying means disposed in said gap and including provisions for translating a mechanical impulse.

5. An impulse motor comprising, a magnetic circuit having a cross-sectional figure-8 configuration and including an air gap in its central leg, means for developing a constant magnetic field through said central leg of said circuit and extending transversely of said air gap, means for impulse-magnetizing an outer leg of said magnetic circuit normal to said central leg and substantially normally to said transverse field, and reciprocable closed-circuit current-carrying means disposed in said gap and including provisions for translating a mechanical impulse.

6. An impulse motor comprising, a magnetic circuit having a cross-sectional configuration comprising a closed outer yoke portion having a window therein and a cruciform central core portion and including symmetrically disposed air gaps extending transversely of opposed legs of said core portion, means for developing opposed constant magnetic fields through said opposed legs, means for impulse-magnetizing the other opposed legs of said core portion in the same sense, and reciprocable closed-circuit current-carrying means disposed in said gaps and including provisions for translating a mechanical impulse.

7. An impulse motor comprising, a shell-type magnetic member having a cylindrical bore therein, a cylindrical core substantially filling said bore, the cross-sectional configuration of said member and core in a plane including the axis of said core comprising a closed outer yoke portion having a window therein and a cruciform central core portion and including symmetrically disposed air gaps extending transversely of opposed legs of said core portion, means for developing opposed constant magnetic fields through said opposed legs, means for impulse-magnetizing the other opposed legs of said core portion in the same sense, and reciprocable closed-circuit current-carrying means disposed in said gaps and including provisions for translating a mechanical impulse.

8. An impulse motor comprising, a shell-type magnetic member having a cylindrical bore therein and two pairs of opposed winding slots extending normally to said bore but opening thereinto, a cylindrical core substantially filling said bore and having a pair of annular winding slots individually registering with said pairs of opposed slots, said member and said core forming a core portion between said pairs of winding slots having an annular air gap therein, a field winding disposed in each of said opposed pairs of slots and adapted to be excited with a constant current, a pair of armature windings disposed in said annular slots and adapted to be excited with an impulse current, and an annular closed-circuit current-carrying member disposed in said gap and including provisions for translating a mechanical impulse.

9. An impulse motor comprising, a magnetic circuit including an air gap, means for developing a constant magnetic field through said circuit and extending transversely of said air gap, means for impulse-magnetizing a portion of said magnetic circuit adjacent said gap substantially normally to said transverse field, and a reciprocable closed-circuit member of highly conductive material disposed in said gap and including provisions for translating a mechanical impulse.

10. An impulse motor comprising, a magnetic circuit including an air gap, means for developing a constant magnetic field through said circuit and extending transversely of said air gap, means for impulse-magnetizing a portion of said magnetic circuit adjacent said gap substantially normally to said transverse field, a reciprocable closed-circuit member of highly conductive material disposed in said gap, and at least one actuating rod secured to said member and extending outside said magnetic circuit and including provisions for translating a mechanical impulse.

11. An impulse motor comprising, a magnetic circuit including a cylindrical air gap, means for developing a constant magnetic field through said circuit and extending transversely of said air gap, means for impulse-magnetizing the portion of said magnetic circuit within said gap substantially axially thereof, and a cylindrical reciprocable closed-circuit current-carrying member disposed in said gap and including provisions for translating a mechanical impulse.

12. An impulse motor comprising, a magnetic circuit including an annular air gap, means for developing a constant magnetic field through said circuit and extending transversely of said air gap, means for impulse-magnetizing the portion of said magnetic circuit within said gap substantially axially thereof, and an annular reciprocable closed-circuit current-carrying member disposed in said gap and including provisions for translating a mechanical impulse.

13. An impulse motor comprising, a magnetic circuit including a cylindrical air gap, means for developing a constant magnetic field through said circuit and extending transversely of said air gap, means for impulse-magnetizing the portion of said magnetic circuit within said gap substantially axially thereof, and a cylindrical reciprocable closed-circuit current-carrying member disposed in said gap, a plurality of symmetrically spaced actuating rods secured to said member and extending outside said magnetic circuit, and a yoke interconnecting the outside ends of said rods and including provisions for translating a mechanical impulse.

14. An impulse motor comprising, a magnetic circuit including an air gap, means for developing a constant magnetic field through said circuit and extending transversely of said air gap, means for magnetically biasing a portion of said magnetic circuit adjacent said gap substantially normally to said transverse field and for impulse-magnetizing said portion of said circuit with a polarity opposite that of said magnetic bias, and a reciprocable closed-circuit current carrying member disposed in said gap and including provisions for translating a mechanical impulse.

15. An impulse motor comprising, a magnetic circuit including an air gap, means for developing a constant magnetic field through said circuit and extending transversely of said air gap, an armature winding, means for exciting said winding to bias magnetically a portion of said magnetic circuit adjacent said gap substantially normally to said transverse field and for exciting said winding with a current impulse to impulse-magnetize said portion of said circuit with a polarity opposite that of said magnetic bias, and a reciprocable closed-circuit current-carrying member disposed in said gap and including provisions for translating a mechanical impulse.

16. An impulse motor comprising, a magnetic circuit including an air gap, means for developing a constant magnetic field through said circuit and extending transversely of said air gap, a direct-current supply circuit, an armature winding normally connected to said circuit with a given polarity to bias magnetically a portion of said magnetic circuit adjacent said gap substantially normally to said transverse field, means for connecting said winding to said circuit with reversed polarity to impulse-magnetize said portion of said circuit with a polarity opposite that of said magnetic bias, and a reciprocable closed-circuit current-carrying member disposed in said gap and including provisions for translating a mechanical impulse.

17. An impulse motor comprising, a magnetic circuit including an air gap, means for developing a constant magnetic field through said circuit and extending transversely of said air gap, a direct-current supply circuit, an armature winding normally connected to said circuit with a given polarity to magnetically bias a portion of said magnetic circuit adjacent said gap substantially normally to said transverse field, means for connecting said winding to said circuit with reversed polarity to impulse-magnetize said portion of said circuit with a polarity opposite that of said magnetic bias, a reciprocable closed-circuit current-carrying member disposed in said gap and including provisions for translating a mechanical impulse, and means for subsequently restoring the connection of said winding to said circuit to said given polarity.

18. An impulse motor comprising, a magnetic circuit including an air gap, means for developing a constant magnetic field through said circuit and extending transversely of said air gap, a direct-current supply circuit, an armature winding normally connected to said circuit with a given polarity to magnetically bias a portion of said magnetic circuit adjacent said gap substantially normally to said transverse field, means for connecting said winding to said circuit with reversed polarity to impulse-magnetize said portion of said circuit with a polarity opposite that of said magnetic bias, a reciprocable closed-circuit current-carrying member disposed in said gap and including provisions for translating a mechanical impulse, and means responsive to operation of said translating member for subsequently restoring the connection of said winding to said circuit to said given polarity.

19. An impulse motor comprising, a magnetic circuit including an air gap, means for developing a constant magnetic field through said circuit and extending transversely of said air gap, a direct-current supply circuit, an armature winding normally connected to said circuit with a given polarity to magnetically bias a portion of said magnetic circuit adjacent said gap substantially normally to said transverse field, means for connecting said winding to said circuit with reversed polarity for an interval to impulse-magnetize said portion of said circuit with a polarity opposite that of said magnetic bias, and a reciprocable closed-circuit current-carrying member disposed in said gap and including provisions for translating a mechanical impulse.

20. An impulse motor for use in a machine-gun synchronizing system and adapted to actuate a machine gun sear pin comprising, a magnetic circuit including an air gap, stationary winding means for developing a constant magnetic field through said circuit and extending transversely of said air gap, stationary winding means for developing an impulse magnetic field in the vicinity of said gap and reciprocable means responsive jointly to said two fields and including provisions adapted to actuate a machine gun sear pin.

21. An impulse motor comprising, a magnetic circuit having a cross-sectional figure-8 configuration and including an air gap in its central leg, means for developing a constant magnetic field through said central leg of said circuit and extending transversely of said air gap, means for magnetically biasing an outer leg of said magnetic circuit normal to said central leg and substantially normally to said tranverse field, means for impulse-magnetizing said outer leg with a polarity opposite to that of its magnetic bias, and reciprocable closed-circuit current-carrying means disposed in said gap and including provisions for translating a mechanical impulse.

22. An impulse motor comprising, a magnetic circuit having a cross-sectional configuration comprising a closed outer yoke portion having a window therein and a cruciform central core portion and including symmetrically disposed air gaps extending transversely of opposed legs of said core portion, means for developing opposed constant magnetic fields through said opposed legs, means for magnetically biasing the other opposed legs of said core portion in the same sense, means for impulse magnetizing said other opposed legs with a polarity opposite to that of said magnetic bias, and reciprocable closed-circuit current-carrying means disposed in said gaps and including provisions for translating a mechanical impulse.

23. An impulse motor comprising, a shell-type magnetic member having a cylindrical bore therein, a cylindrical core substantially filling said bore, the cross-sectional configuration of said member and said core in a plane including the axis of said core comprising a closed outer yoke portion having a window therein and a cruciform central core portion and including symmetrically disposed air gaps extending transversely of opposed legs of said core portion, means for developing opposed constant magnetic fields through said opposed legs, means for magnetically biasing the other opposed legs of said core portion in the same sense, means for impulse-magnetizing said other opposed legs with a polarity opposite to said magnetic bias, and reciprocable closed-circuit current-carrying means disposed in said gaps and including provisions for translating a mechanical impulse.

24. An impulse motor comprising, a shell-type magnetic member having a cylindrical bore therein and two pairs of opposed winding slots extending normally to said bore but opening thereinto, a cylindrical core substantially filling said bore and having a pair of annular winding slots individually registering with said pairs of opposed slots, said member and said core forming a core portion between said pairs of winding slots having an annular air gap therein, a field winding disposed in each of said opposed pairs of slots and adapted to be excited with a constant current, a pair of armature windings in said annular slots and adapted to be excited with an impulse current, an auxiliary magnetic circuit substantially independent of said magnetic member and extending between opposite ends of said core member, a winding on said auxiliary magnetic circuit for magnetically biasing said core member with a polarity opposite to the magnetization thereof by said armature windings, and an annular closed-circuit current-carrying member disposed in said gap and including provisions for translating a mechanical impulse.

HERBERT C. ROTERS.

REFERENCES CITED

The following references are of record in the file of this patent:

UNITED STATES PATENTS

| Number | Name | Date |
| --- | --- | --- |
| 778,021 | Feingold | Dec. 20, 1904 |
| 1,951,666 | Martin | Mar. 20, 1934 |
| 2,113,165 | Young | Apr. 5, 1938 |
| 2,118,862 | Rayment | May 31, 1938 |
| 2,194,535 | Von Delden | Mar. 26, 1940 |
| 2,225,599 | Gaty | Dec. 17, 1940 |